US010292528B2

(12) United States Patent
Perillon et al.

(10) Patent No.: US 10,292,528 B2
(45) Date of Patent: *May 21, 2019

(54) NON-STICK COATING WITH IMPROVED HYDROPHOBIC PROPERTIES

(75) Inventors: Jean-Luc Perillon, St Paul Trois Chateaux (FR); Aurelien Dubanchet, Gresy sur Aix (FR)

(73) Assignee: SEB SA, Ecully (FR)

(*) Notice: Subject to any disclaimer, the term of this patent is extended or adjusted under 35 U.S.C. 154(b) by 1250 days.

This patent is subject to a terminal disclaimer.

(21) Appl. No.: 12/595,868

(22) PCT Filed: Apr. 10, 2008

(86) PCT No.: PCT/FR2008/050630
§ 371 (c)(1),
(2), (4) Date: Mar. 24, 2010

(87) PCT Pub. No.: WO2008/142327
PCT Pub. Date: Nov. 27, 2008

(65) Prior Publication Data
US 2010/0181322 A1   Jul. 22, 2010

(30) Foreign Application Priority Data

Apr. 18, 2007 (FR) ...................... 07 02811

(51) Int. Cl.
| A47J 36/00 | (2006.01) |
| B32B 27/00 | (2006.01) |
| A47J 36/02 | (2006.01) |
| C09D 183/04 | (2006.01) |

(52) U.S. Cl.
CPC ............. *A47J 36/02* (2013.01); *A47J 36/025* (2013.01); *C09D 183/04* (2013.01)

(58) Field of Classification Search
CPC ... C09D 183/04; C08L 2666/54; C08L 83/00; A47J 36/02; A47J 36/025
USPC ............................................................. 106/2
See application file for complete search history.

(56) References Cited

U.S. PATENT DOCUMENTS

| 4,477,517 A | * | 10/1984 | Rummel ................. A47J 36/02 427/299 |
| 7,510,774 B2 | * | 3/2009 | Greene et al. ................. 428/447 |
| 8,372,496 B2 | * | 2/2013 | Le Bris et al. ............... 428/34.4 |
| 2006/0147829 A1 | | 7/2006 | Huang et al. |

FOREIGN PATENT DOCUMENTS

| EP | 0368666 A2 | 5/1990 |
| EP | 1484372 A1 | 12/2004 |
| EP | 1835002 A2 | 9/2007 |

(Continued)

OTHER PUBLICATIONS

International Search Report from priority application.

(Continued)

*Primary Examiner* — Shuangyi Abu Ali
(74) *Attorney, Agent, or Firm* — Harness, Dickey & Pierce, P.L.C.

(57) ABSTRACT

The present invention generally relates to anti-stick coatings for cooking utensils, which exhibit improved properties of hydrophobicity and resistance to high temperature. The present invention also relates to a culinary article comprising a support coated in said coating, and a process for applying on the support such a coating according to the invention.

38 Claims, 2 Drawing Sheets

(56) References Cited

FOREIGN PATENT DOCUMENTS

Figure 1:
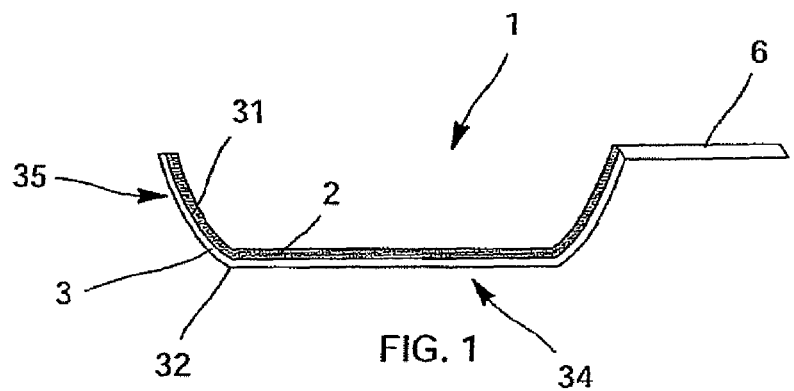

| | | | | |
|---|---|---|---|---|
| FR | 2576253 A1 | 7/1986 | | |
| FR | 2581390 A1 | 11/1986 | | |
| FR | 2868276 A1 | 10/2005 | | |
| JP | H07228841 A | 8/1995 | | |
| JP | 2003164379 A | 6/2003 | | |
| JP | 2004-226751 | * | 8/2004 | ............... G03G 5/14 |
| KR | 20050072928 A | 7/2005 | | |
| KR | 1020050072928 A | 7/2005 | | |
| WO | 97/13730 A2 | 4/1997 | | |
| WO | 2004076570 A1 | 9/2004 | | |

OTHER PUBLICATIONS

EP08788152.0 European Office Action (corresponding application) dated Jul. 18, 2016.

Dow Corning, Dow Corning 200 Fluid product information; No. 22-0069N-01; May 11, 1998.

* cited by examiner

NON-STICK COATING WITH IMPROVED HYDROPHOBIC PROPERTIES

FIELD

The present invention generally relates to anti-stick coatings for cooking utensils, which exhibit improved properties of hydrophobicity and resistance to high temperature.

BACKGROUND

In this field, enamel-based coatings are already known, but these do not guarantee proper anti-adherence, and need high vitrification temperatures (above 540° C.). Sol-gel coatings, especially those obtained by polymerisation of silanes, are also known. But they do not deposit significant thickness and generally become faience for thicknesses of the order of 10 microns. Also, their cohesion is achieved only if high enough temperatures are applied over long periods, for example temperatures above 400° C., for at least thirty minutes. On the contrary, this type of coating allows a range of use in temperatures greater than those of PTFE-based coatings, up to 600° C., as opposed to 300° C. maximum for PTFE-based coatings. But this happens to the detriment of anti-adherence.

The disadvantage of such coatings is that they lose their hydrophobic properties after aggression likely to degrade the surface of the coating, and especially chemical aggression such as that caused by dishwasher detergents, or aggression of mechanical type such as that caused by excessive rubbing of the coating by means of an abrasive buffer, or even exposure of the order of a few minutes at extreme temperature.

To rectify these problems, the applicant has developed an anti-stick coating obtained via sol-gel polymerisation of a composition based on at least one metallic alcoxide and a colloidal metallic oxide. The applicant has discovered surprisingly that when a very small quantity of silicon oil is added to such a composition, the coating formed by sol-gel from this composition not only resists high temperature, but is also capable of supporting contact of a few minutes with the flame of a Bünsen burner (the temperature of which is above 600° C.), and then rapidly regaining its hydrophobic character.

It is known to the person skilled in the art to use silicon oil for making sol-gel coatings from a composition based on alcoxysilane and colloidal silica.

US patent application US 2006/0147829 describes a process for making superhydrophobic coatings for self-cleaning surfaces, having a contact angle with water greater than 130°. This process comprises a preparation step of nanoparticles (especially silica nanoparticles) preferably of a size varying from 1 nm to 100 nm, and a processing step of these particles with a hydrophobic agent and an additive, the hydrophobic agent preferably being based on silicon, and the additive being selected from mineral and organic bases. These nanoparticles can be prepared by a humid synthesis process, and in particular by sol-gel method, from precursors comprising water, solvent, especially an alcohol, and a metallic alcoxide such as for example tetramethoxysilane (TMOS) or tetraethoxysilane (TEOS). After forming of the nanoparticles, they are mixed directly with the hydrophobic agent and the additive, and left to react at a temperature of between 0 and 100° C. The resulting material is applied to a substrate (especially glass, plastic, metal, ceramic, or polymer or composite) according to any technique for producing a coating from a liquid (by centrifuge, soaking, or by coating by brush or roller). Then, after being applied to the substrate the coating is dried at a temperature between ambient temperature and 200° C. The resulting coating has a hydrophobic surface forming a contact angle with water of over 130°, or even over 150°.

However, there is no mention in US 2006/0147829 of the antiadhesive character of the resulting coating, nor of its capacity to resist high temperatures and its aptitude for revealing a hydrophobic character after aggression of the surface of the coating. Also, US 2006/0147829 does not indicate that the sol-gel coating is in the form of a continuous film having a thickness of at least 10 µm.

SUMMARY

The object of the present invention is therefore an anti-stick coating having improved hydrophobic properties and resisting high temperature, characterised in that it is in the form of a film having a thickness of at least 10 µm and is constituted by a sol-gel material comprising:
  a matrix of at least one metallic polyalkoxylate,
  at least 5% by weight relative to the total weight of the coating of at least one colloidal metallic oxide dispersed in said matrix, and
  at least one silicon oil.

The coating according to the invention is preferably free of PTFE.

The essential aspect of the hydrophobic character of the surface of the coating is ensured by metallic polyalkoxylate and silicon oil. In fact, metallic polyalkoxylate has hydrophobic groups which are destroyed at high temperature during contact with flame. But this disappearance of the hydrophobic character is momentary, as it is progressively compensated by silicon oil trapped in polyalkoxylate and whereof the surface migration in infinitesimal quantities favours progressive reconstitution of hydrophobic groups of polyalkoxylate at the surface of the film.

It is evident that with a coating according to the invention comprising at least 0.1% by weight of silicon oil, reconstitution of the hydrophobic character is sufficient at the time of fresh cooking. In fact, the value of the static contact angle $\Theta$ of a drop of water deposited on the coating of the invention is of the order of 20° after thermal aggression of flame contact type. This static contact angle value rises to at least 75° C. after a reconstitution process of the hydrophobic properties consisting of reheating of ambient temperature to 200° C. over a period of at least 5 minutes, that is, when the utensil is ready for new cooking.

Silicon oil preferably represents 0.1 to 6% by weight and better 0.3 to 5% by weight of the total weight of the coating (dry state). Below 0.1% by weight of silicon oil, reconstitution of the hydrophobic groups having disappeared during flame contact (600° C.) is less, the resulting angle being less than 62°.

More preferably, the sol-gel material of the coating according to the invention comprises 0.5 to 2% by weight of silicon oil relative to the total weight of the dry coating. In this case, the initial static contact angle $\Theta$ of a drop of water deposited on such a coating is 95°. Following thermal aggression of flame contact type this coating has an angle of 20°. After a reconstitution process comprising at least one step of reheating of ambient temperature to 200° C. over a period of at least 5 minutes, the static contact angle becomes greater than 75° when the utensil is ready for new cooking.

The coating according to the invention can comprise silicon oil or a mixture of silicon oils.

Particular examples of silicon oils usable in the coating according to the invention are phenyl silicons, methylphenyl silicons and methyl silicons.

If the coating according to the invention is utilised to be in contact with foodstuffs, a food-grade silicon oil will preferably be selected, and in particular an oil selected from food-grade methylphenyl silicons and methyl silicons.

Particular examples of silicon methylphenyl oils are non-food oils marketed by the company WACKER under the brand name WACKER SILICONOL AP150 and by the company DOW CORNING under the brand name DOW CORNING 550 fluid, as well as food oils marketed by the company WACKER ARM. Particular examples of silicon methyl oils are oil marketed by the company RHODIA under the brand name RHODIA 47 V 350, oil of the company WACKER 200 fluid, or again oil of the company TEGO ZV 9207, which are food-grade methyl silicon oils.

Silicon oil selected from those mentioned hereinabove will preferably be used, with a molecular weight of at least 1000 g, which is non-reactive and has a viscosity of between 20 and 2000 mPa·s.

Advantageously, the matrix of the coating according to the invention comprises by way of metallic polyalkoxylate a polyalkoxysilane, and especially amorphic polyalkoxysilane, aluminate, titanate, zirconate, vanadate, or mixtures thereof.

The matrix of the coating according to the invention preferably comprises polyalkoxysilane and/or aluminate to constitute a mixed matrix.

In a variant of the invention, the matrix of the coating according to the invention is grafted by one or more organic groups selected from alkyl groups in $C_1$-$C_4$ and phenyl groups. These groups are necessary for improving the hydrophobicity of the coating.

The matrix of the coating according to the invention is preferably grafted by one or more methyl groups, which improve the hydrophobic character of the coating without impeding formation of the inorganic network.

Apart from the matrix of at least one metallic polyalkoxylate the anti-stick coating according to the invention comprises at least 5% by weight, and preferably from 5 to 30% by weight relative to the total weight of the coating of at least one colloidal metallic oxide, which is preferably finely dispersed in the matrix. This metallic oxide is generally in the form of aggregates, the size of which is less than one micron, or even 300 or 400 nm.

The presence of colloidal metallic oxide in the matrix of the coating according to the invention produces a film of sufficient thickness, specifically a thickness of at least 10 µm. If the thickness of the coating is less than 10 µm, there is not good cohesion of the film formed.

The film preferably has a thickness of between 10 and 80 µm, and best between 30 and 70 µm such that the resulting film is continuous, coherent and sufficient for absorbing the roughness of the support.

Particular examples of colloidal metallic oxide utilisable in the anti-stick coating according to the invention are silica, alumina, cerium oxide, zinc oxide, vanadium oxide and zirconium oxide. Preferred colloidal metallic oxides are silica and alumina.

Advantageously, the sol-gel material of the coating according to the invention can also comprise fillers for improving cohesion of the film of formed coating, and/or pigments, for conferring colour to the coating. The presence of fillers and/or pigments also has a beneficial effect of the hardness of the film.

Particular examples of fillers utilisable in the coating according to the invention are alumina, zirconium, mica, clays (such as montmorillonite, sepiolite, gypsite, kaolinite) and zirconium phosphate.

Particular examples of pigments utilisable in the coating according to the invention are titanium dioxide, mixed oxides of copper-chrome-manganese, iron oxides, carbon black, pyralene red, aluminosilicates, metallic flakes and especially aluminium flakes.

The fillers and/or pigments are preferably in the form of flakes, the advantage of which is to improve the hardness of the anti-stick coating.

The pigment and/or the fillers are preferably of nanometric size so as to improve their dispersion and their distribution in the coating, imparting substantial regularity of performance.

The anti-stick coating according to the invention can be used for coating the inner face of a cooking utensil, but also by way of:
  coating of plates, grills or barbecue shells,
  coating of electric cooking equipment (crêpe pan, waffle irons, table grills, raclette, fondus, rice cookers, jam makers, bread machines pans, "blender" containers and mixing blades of this equipment),
  coating of walls of household ovens (electric, gas, microwave, steam ovens),
  coating of kitchen utensils (spatulas, ladles, forks, spoons),
  coating of sleeves or buttons of culinary articles).

The present invention also relates to a culinary article comprising a support coated in coating according to the invention.

More particularly, the aim of the present invention is a culinary article having improved hydrophobic properties, comprising a support having an inner face capable of receiving foodstuffs and an outer face intended to be arranged towards the heat source, characterised in that the inner face of the support is coated with an anti-stick coating according to the invention.

In an advantageous version of the culinary article according to the invention, the support is a hollow cap of a culinary article, having a base and a side wall rising from said base.

The support of the culinary article according to the invention is made of a material selected from metals, wood, glass, ceramics, and plastics.

Advantageous examples of metallic supports utilisable in the process according to the invention are supports made of aluminium, anodised or not, or polished, sanded, brushed or beaded aluminium alloy, supports of polished, sanded, brushed or beaded stainless steel, cast-iron supports, iron supports, or supports of hammered or polished copper.

Finally, the present invention also relates to a process for making a coating according to the invention on a support.

More particularly, the object of the present invention is a process for applying to one of the faces of a support at least one anti-stick coating according to the invention, characterised in that it comprises the following steps:
  a) preparation of an aqueous composition A comprising:
    i) 5 to 30% by weight relative to the total weight of the aqueous composition A of at least one colloidal metallic oxide,
    ii) 0 to 20% by weight relative to the weight of the composition A of a solvent comprising at least one alcohol,
    iii) 0.05 to 3% by weight relative to the total weight of said aqueous composition A of at least one silicon oil.

b) preparation of a solution B comprising at least one precursor of metallic alcoxide type, which is advantageously partially combined with an acid in terms of Bronsted or Lewis.

c) mixing the solution B of metallic alcoxide with the aqueous composition A to obtain a sol-gel composition (A+B) with 40 to 75% by weight of aqueous composition relative to the weight of the sol-gel composition (A+B), such that the quantity of colloidal metallic oxide represents 5 to 30% by weight of the sol-gel composition (A+B) in the dry state.

d) application to the support of at least one layer of the sol-gel composition (A+B) having a humid thickness of at least 20 then e) cooking of said layer at a temperature of between 180 and 350° C. to produce a coating with improved hydrophobic properties.

With respect to preparation of the aqueous composition A, it is necessary to incorporate at least 5% by weight of at least one colloidal metallic oxide relative to total weight of the composition A to form a film having after cooking a thickness of at least 10 microns. If however there is more than 30% by weight relative to the weight of the composition A, the latter is no longer stable.

The colloidal metallic oxide of the aqueous composition A is such as defined hereinabove, and preferably selected from colloidal silica and/or colloidal aluminae.

The aim of the presence of an alcohol-based solvent is to improve the compatibility of the aqueous composition A with the solution B of metallic alcoxide.

It is however possible to work without solvent, but in this case the choice of polyalkoxylates is reduced to those having excellent compatibility with water. An excessive quantity of solvent (above 20%), is possible, but unhelpfully generates volatile organic compounds, which is not favourable for the environment.

A solvent alcoholic oxygen or an ether-alcohol is preferably used by way of solvent in the aqueous composition A of the invention.

For producing an anti-stick coating according to the invention on a support, it is necessary for the silicon oil to be present in the aqueous composition at a rate of 0.05 to 3% by weight relative to the total weight of the composition.

A composition comprising 0.5 to 2% by weight of silicon oil produces a coating according to the invention which has hydrophobic properties reconstituable within the scope of a process of culinary usage. The silicon oil of the composition A is a food-grade silicon oil defined hereinabove.

The aqueous composition A of the invention can also comprise des fillers and/or des pigments, which are such as defined hereinabove.

The aqueous composition A of the invention can also comprise pyrogenated silica, the function of which is regulating the viscosity of the sol-gel composition and/or the brilliance of the dry coating.

With respect to preparation of the solution B, a metallic alcoxide selected from the group constituted by is preferably used by way of precursor:

precursors responding to the general formula $M_1(OR_1)_n$,
precursors responding to the general formula $M_2(OR_2)_{(n-1)}R_2'$, and
precursors responding to the general formula $M_3(OR_3)_{(n-2)}R_3'_2$, with:
$R_1$, $R_2$, $R_3$, or $R_3'$ designating an alkyl group,
$R_2'$ designating an alkyl group or phenyl, n being a whole number corresponding to the maximum valence of the metals $M_1$, $M_2$, or $M_3$, $M_1$, $M_2$, or $M_3$ designating a metal selected from Si, Zr, Ti, Sn, Al, Ce, V, Nb, Hf, Mg, or Ln.

Advantageously the metallic alcoxide of the solution B is an alcoxysilane.

Particular examples of alkoxysilanes utilisable in solution B of the process of the invention are methyltrimethoxysilane (MTMS), tetraethoxysilane (TEOS), methyltriethoxysilane (MTES) and dimethyldimethoxysilane, and mixtures thereof, preferred alkoxysilanes being TEOS and the MTMS.

According to an advantageous embodiment of the process of the invention the solution B can comprise a mixture of an alkoxysilanes such as defined hereinabove and an aluminium alkoxide.

The precursor of metallic alcoxide type of the solution B is mixed with an organic, mineral Lewis acid which represents 0.01 to 10% by weight of the total weight of the solution B.

Particular examples of acids utilisable for mixing with the precursor of metallic alcoxide are acetic acid, citric acid, ethyl acetoacetate, hydrochloric acid or formic acid.

Preferred acids according to the invention are organic acids, and more particularly acetic acid and formic acid.

After the preparation of the aqueous composition A and that of the solution B of precursor, they are intermixed to form a sol-gel composition (A+B). The respective quantities of each of the compositions A and B must be adjusted such that the quantity of colloidal silica in the sol-gel composition represents 5 to 30% by dry weight.

The sol-gel composition (A+B) of the invention can be applied to the support by pulverisation or by any other application method such as soaking, buffering, by brush, roller, by spin coating or by serigraphy. However, within the scope of an object in form, pulverisation for example by means of a pistol has the advantage of forming a homogeneous and continuous film, which, after cooking, forms a continuous coating with a regular and tight thickness.

After application of the sol-gel composition (A+B) according to the invention, drying generally follows, preferably at 80° C., for 3 minutes. Cooking takes place in a preferred mode at a temperature of between 220 and 280° C.

According to an advantageous embodiment of the process of the invention, it further comprises, after the production step of the first anti-stick coating:

producing a decor by application, then drying on at least part of the first anti-stick coating of a decorative composition comprising a thermostable binder resisting at least 200° C. and a chemical substance optically non transparent or thermochromic, producing a second anti-stick coating by application, then drying and cooking on the decor of at least one layer of sol-gel composition in keeping with steps a) to c) of the process of the invention.

The process according to the invention can also comprise a step of depositing a layer of enamel to the face opposite that coated by an anti-stick coating according to the invention, this depositing step of the layer of enamel being carried out prior to that of the anti-stick coating according to the invention.

In addition to the advantages mentioned hereinabove, the process in keeping with the invention is particularly simple to carry out and can easily be envisaged without upsetting the conventional production process of culinary articles.

The process according to the invention also has the advantage of being able to be carried out without recourse to previous mechanical or chemical processing of the first face of the support intended to be coated by the first coating, which has a clear advantage from the economic and ecological viewpoint.

DRAWINGS

Figure 2:
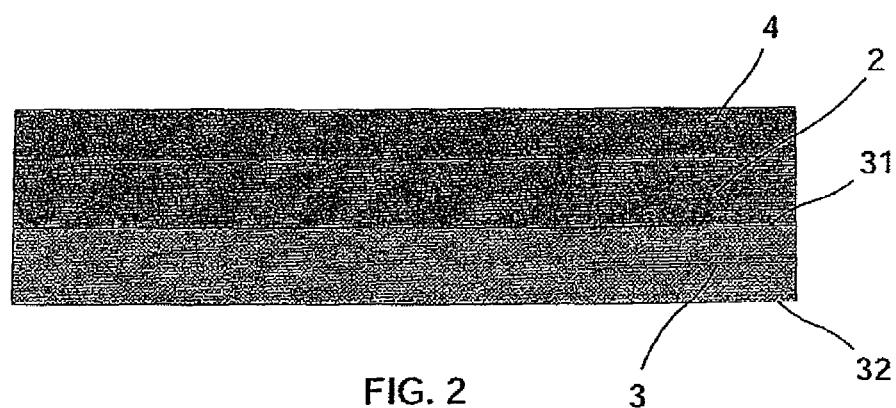
Figure 3:
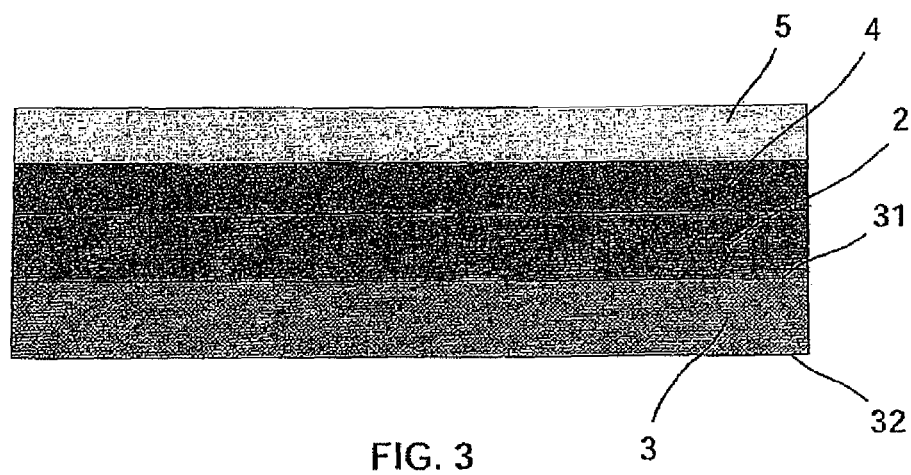
Figure 4:
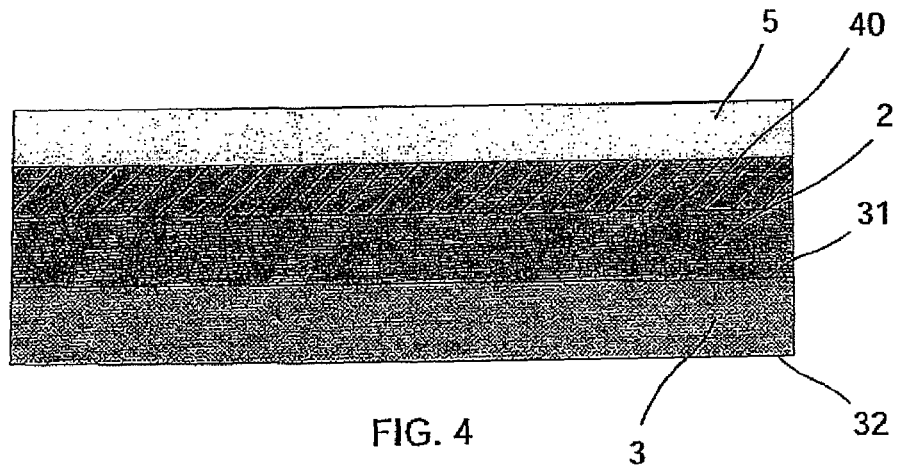
Figure 5:
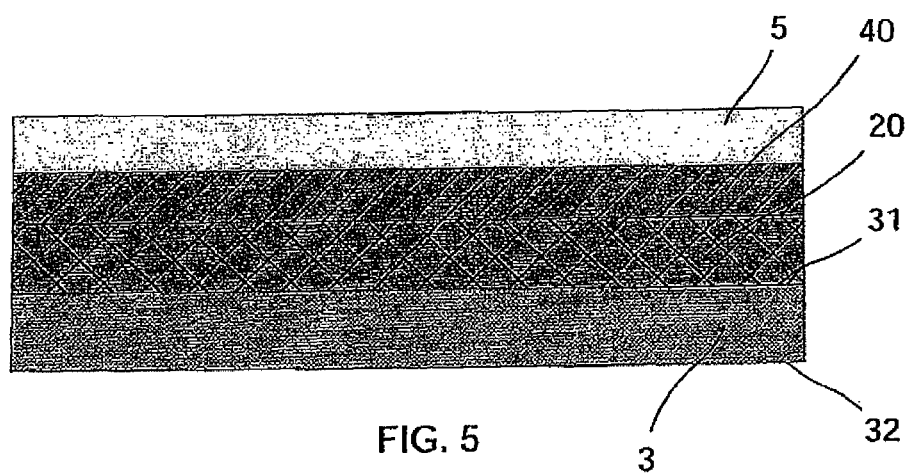
Figure 6:
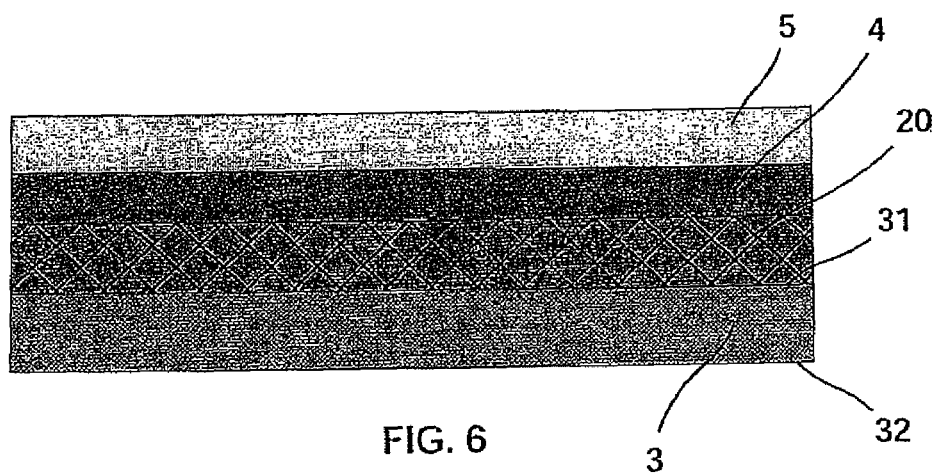

Other advantages and particular features of the present invention will emerge from the following description, given by way of non-limiting example and done in reference to the attached figures:

FIG. 1 illustrates a schematic sectional view of a culinary article according to the invention according to a first variant embodiment, FIG. 2 illustrates a schematic sectional view of a culinary article support according to the invention according to a second variant embodiment, FIG. 3 illustrates a schematic sectional view of a culinary article support according to the invention according to a third variant embodiment, FIG. 4 illustrates a schematic sectional view of a culinary article support according to the invention according to a fourth variant embodiment, FIG. 5 illustrates a schematic sectional view of a culinary article support according to the invention according to a fifth variant embodiment, FIG. 6 illustrates a schematic sectional view of a culinary article support according to the invention according to a sixth variant embodiment.

DETAILED DESCRIPTION

Identical elements represented in FIGS. 1 to 6 are identified by identical reference numerals.

By way of example of a culinary article according to the invention, FIG. 1 illustrates a skillet 1 comprising a support 3 in the form of a hollow cap with a base 34 and a side wall 35 rising from the base 34, and a gripping handle 6. The support 3 comprises an inner face 31 capable of accommodating foodstuffs, and an outer face 32 intended to be arranged to the side of the heat source, such as a cooking plate or a burner.

FIGS. 2 to 6 illustrate only the support 3 of the culinary article (or more exactly its base 34).

In FIGS. 1 to 3, the inner face 31 of the support 3 is covered by an anti-stick coating according to the invention 2, called the base coating.

In the variants illustrated in FIGS. 2 and 3, a layer of décor 4 covers the base coating 2 and is constituted by a sol-gel material comprising a matrix of at least one metallic polyalkoxylate at least 5% by weight relative to the total weight of the decor of at least one colloidal metallic oxide and at least one silicon oil.

More particularly, in the variant illustrated in FIG. 3 a second anti-stick coating 5, known as surface coating, covers the layer of décor 4. This anti-stick surface coating 5 is an anti-stick coating 5 according to the invention.

The variant illustrated in FIG. 4 differs from that illustrated in FIG. 3 in that the décor 40 is constituted by a sol-gel material not comprising silicon oil. In fact, the décor 40 is constituted by a sol-gel material comprising a matrix of at least one metallic polyalkoxylate and at least 5% by weight relative to the total weight of the decor of at least one colloidal metallic oxide.

The variant illustrated in FIG. 5 differs from that illustrated in FIG. 4 in that the base anti-stick coating 20 covering the inner surface 31 of the support 3 does not comprise silicon oil either. In fact, this is a base coating 20 constituted by a sol-gel material comprising a matrix of at least one metallic polyalkoxylate and at least 5% by weight relative to the total weight of the anti-stick surface coating of at least one colloidal metallic oxide.

The variant illustrated in FIG. 6 differs from that illustrated in FIG. 5, in that the décor 4 is constituted by a sol-gel material comprising silicon oil, that is, a layer of décor 4 according to that of the variant illustrated in FIG. 3.

For the six variant embodiments, the layers of décor 4, 40 can be continuous layers partially covering the base layer 2, 20, or discontinuous layers, for example in the form of points or elementary patterns.

The décor 4 preferably comprises a reversible thermochromic chemical substance, said decor partially covering said anti-stick coating 2.

The chemical thermochromic substance mentioned hereinabove can be selected from those which lighten with a rise in temperature. This applies to perylene red associated with a black pigment. The chemical substance can also be selected from those which darken with temperature. This applies to ferric oxide $Fe_2O_3$.

Advantageously, the decor can comprise at least two patterns, one of the patterns including a chemical substance which lightens with temperature, such as for example perylene red associated with a black pigment, and the other pattern including a chemical substance which darkens with a rise in temperature, for example ferric oxide $Fe_2O_3$.

So, the contrast between the two pigments better distinguishes the change in temperature. If the chemical compounds hereinabove are used in each of the patterns of the decor (a pattern comprising ferric oxide $Fe_2O_3$ and the other pattern comprising perylene red associated with a black pigment), a very marked contrast between the two patterns from 200° C. is observed, that is, the optimal temperature for frying or roasting.

In a particularly advantageous version of this embodiment, the base anti-stick coating comprises fillers and/or pigments not optically transparent, and the anti-stick surface coating comprises neither fillers nor pigments or else comprises optically transparent fillers and/or pigments, and the decor comprises a thermostable binder resisting at least 200° C. and a reversible chemical thermochromic substance.

The combined advantages of such an article are at the same time hydrophobic, even after contact with flame, and being able to inform a user of the temperature of the cooking surface of a culinary article.

In fact, given that the upper layer of anti-stick coating according to the invention is transparent, the change in colour of the thermochromic substance of the decor is visible through the upper layer of anti-stick coating.

The change in colour described hereinabove allows the user to be warned on the one hand that the culinary article is hot, and therefore presents the risk of burning, and on the other hand that the surface of the article has reached the right temperature for use.

The outer face of the culinary article, opposite the inner face intended to receive the foodstuffs, can also be coated by an anti-stick coating according to the invention, pigmented or not, or by a lacquer base of one or more polyester silicon resins, or by enamel, or any other flame-resistant coating.

The following examples illustrate the invention without limiting its scope.

In the examples, unless indicated otherwise, all quantities are given in grams.

EXAMPLES

Products

Aqueous Composition A
Colloidal Metallic Oxide
colloidal silica in the form of aqueous solution at 30% of silica, marketed by the company Clariant under the brand name Klebosol,
colloidal silica in the form of aqueous solution at 30% silica, marketed by the company Grace Davison under the brand name Ludox,
colloidal alumina in the form of aqueous solution at 5% marketed by the company DGTec.
Solvent
methanol,
ethanol,
Isopropanol,
2-(2-Butoxyethoxy)ethanol (Butylcarbitol).
Silicon Oil
Food-grade methyl silicon oil marketed by the company DOW CORNING under the brand name "DOW CORNING 200 Fluid", and having a viscosity of 300 cSt,
food-grade methyl silicon oil marketed by the company TEGO under the brand name "TEGO ZV 9207".
Pigments
black pigment mineral marketed by the company Ferro under the brand name "FA 1260",
black pigment mineral marketed by the company Ferro under the brand name "FA 1220",
ultramarine pigment marketed by the company Holliday pigments, under the brand name "CM13",
red perylene pigment marketed by BASF,
titanium dioxide white pigment marketed by the company Kronos.
Fillers
Powdered alumina marketed by the company ALCAN under the brand name "CAHPF 1000",
Alumina in nanometric flakes dispersed in aqueous phase at 40% marketed by the company Baikowski,
Powdered alumina is marketed by the company Baikowski under the brand name "DF 1000",
Zirconium phosphate (ZrP) marketed by the company Rhodia,
Clay of BENTONITE SE3010 type marketed by the company Süd Chemie.
Solution B
Precursors
methyltrimethoxysilane (MTMS) responding to the formula $Si(OCH_3)_3CH_3$,
tetraethoxysilane (TEOS) responding to the formula $Si(OC_2H_5)_4$.
Acid
formic acid,
acetic acid.
Tests
hardness evaluated with a Mohs scale: the coating is subjected to the action of materials of different hardness representing the levels of the Mohs hardness scale. The hardness of the coating is expressed by the highest value of the material not representing it.
anti-adherence evaluated by means of the carbonised milk test according to the standard NF D 21-511.
flame resistance: the coating is subjected to the action of a Bünsen burner flame for 30 seconds, cooled by soaking in cold water, then the contact angle is measured.
hydrophobicity: measurement of the contact angle of a drop of water on the coating with a goniometer of Digidrop type by GBX.

Example 1

Preparation of an Aqueous Composition A1, According to the Invention

A first aqueous composition A1 is made according to the invention, which is presented in Table 1:

TABLE 1

| Constituents of part A | Quantity |
| --- | --- |
| aqueous solution at 30% colloidal silica: Ludox | 37 |
| Water | 14.1 |
| Methanol | 5.3 |
| Butylcarbitol | 1.8 |
| Black pigment FA 1260 | 26.4 |
| Alumina CAHPF 1000 | 13.2 |
| Silicon oil TEGO ZV 9207 | 2.2 |
| TOTAL | 100 |

Example 2

Preparation of an Aqueous Composition A2 According to the Invention

A second aqueous composition A2 is made according to the invention, which is presented in Table 2:

TABLE 2

| Constituents of part A | Quantity |
| --- | --- |
| aqueous solution at 30% colloidal silica: Klebosol | 48.5 |
| Water | 6 |
| Isopropanol | 8 |
| Black pigment FA 1220 | 35 |
| Silicon oil Wacker 200 fluid | 2.5 |
| TOTAL | 100 |

Example 3

Preparation of an Aqueous Control Composition A3 without Silicon Oil

A first aqueous control composition A3 made without silicon oil. This composition is presented in Table 3:

TABLE 3

| Constituents of part A | Quantity |
| --- | --- |
| aqueous solution at 30% colloidal silica: Ludox | 37.83 |
| Water | 14.42 |
| Methanol | 5.42 |
| Butylcarbitol | 1.84 |
| Black pigment FA 1260 | 27 |
| Alumina CAHPF 1000 | 13.49 |
| TOTAL | 100 |

Example 4

Preparation of an Aqueous Control Composition A4 without Silicon Oil

A second aqueous control composition A4 without silicon oil is produced, presented in Table 4:

TABLE 4

| Constituents of part A | Quantity |
|---|---|
| aqueous solution at 30% colloidal silica: Klebosol | 49.74 |
| Water | 6.16 |
| Isopropanol | 8.20 |
| Black pigment FA 1220 | 35.9 |
| TOTAL | 100 |

Example 5

Preparation of an Aqueous Composition A5 Incorporating Colloidal Alumina

An aqueous composition A5 is produced, which is presented in Table 5:

TABLE 5

| Constituents of part A | Quantity |
|---|---|
| aqueous solution at 38% colloidal alumina: Baikowski | 30 |
| Water | 22.5 |
| Isopropanol | 17.1 |
| Black pigment FA 1220 | 20 |
| Alumina powder CAHPF 1000 | 9 |
| Silicon oil DOW 200 fluid | 1.4 |
| TOTAL | 100 |

Example 6

Preparation of a Solution B1 Based on MTMS

A first solution B1 is made according to the invention by mixing 99.6 g of MTMS with 0.4 g of formic acid, giving a solution at 0.4% by weight of acid in the MTMS.

Example 7

Preparation of a Solution B2 Based on MTMS

A second solution B2 is made according to the invention by mixing 59.7 g of MTMS with 0.3 g of acetic acid, giving a solution at 0.5% by weight of acid in the MTMS.

Example 8

Preparation of a Solution B3 Based on MTMS and TEOS

A third solution B3 is made according to the invention by mixing 50 g of MTMS, 9.5 g of TEOS, and 0.5 g of acetic acid to produce a solution at 0.83% by weight of acid in the mixture of silanes.

Example 9

Preparation of a Sol-Gel Composition SG1 According to the Invention

A sol-gel composition SG1 is made according to the invention by adding 100 g of aqueous composition A1 according to the invention to 100 g of solution B1. This is mixed in a planetary mixer for an hour by being kept at a temperature under 60° C., on completion of which a sol-gel composition according to the invention is obtained which is kept at ambient temperature. The composition SG1 is applied 48 hours after mixing.

Example 10

Preparation of a Sol-Gel Composition SG2 According to the Invention

A sol-gel composition SG2 is made according to the invention by adding 100 g of aqueous composition A2 according to the invention to 60 g of solution B2. The A2 and B2 mixture is mixed in a planetary mixer for an hour at a temperature kept under 60° C., on completion of which a sol-gel composition according to the invention is obtained which is kept at ambient temperature. The composition SG2 is applied 48 hours after mixing.

Example 11

Preparation of a Sol-Gel Control Composition SG0I

A sol-gel composition SG01 is made according to the invention by adding 100 g of aqueous composition A3 according to the invention to 100 g of solution B1. This is mixed in a planetary mixer for an hour by being kept at a temperature under 60° C., on completion of which a sol-gel composition according to the invention is obtained which is kept at ambient temperature. The composition SG0I is applied 48 hours after mixing.

Example 12

Preparation of a Sol-Gel Control Composition SG02

A sol-gel composition SG02 is made according to the invention by adding 100 g of aqueous composition A4 according to the invention to 60 g of solution B2. This is mixed in a planetary mixer for an hour by being kept at a temperature under 60° C., on completion of which a sol-gel composition according to the invention is obtained which is kept at ambient temperature. The composition SG02 is applied 48 hours after mixing.

Example 13

Preparation of an Aqueous Composition SG3 According to the Invention

A sol-gel composition SG3 is made according to the invention by adding 100 g of aqueous composition A2 according to the invention to 60 g of solution B3. This is mixed in a planetary mixer for an hour by being kept at a temperature under 60° C., on completion of which a sol-gel composition according to the invention is obtained which is kept at ambient temperature. The composition SG3 is applied 30 hours after mixing.

Example 14

Preparation of an Aqueous Composition SG4 According to the Invention

A sol-gel composition SG4 is made according to the invention by adding 100 g of aqueous composition A5 according to the invention to 100 g of solution B2. This is mixed in a planetary mixer for an hour by being kept at a temperature under 60° C., on completion of which a sol-gel composition according to the invention is obtained which is kept at ambient temperature. The composition SG4 is applied 24 hours after mixing.

The sol-gel compositions SG1 to SG4 of the invention, as well as the sol-gel control compositions SG01 and SG02 are listed in Table 6 hereinbelow.

TABLE 6

| Sol-gel compositions (A + B) | Composition A | Solution B |
| --- | --- | --- |
| SG01 (control) | A3 | B1 |
| SG02 (control) | A4 | B2 |
| SG1 | A1 | B1 |
| SG2 | A2 | B2 |
| SG3 | A2 | B3 |
| SG4 | A5 | B2 |

Example 15

Producing Sol-Gel Coatings on an Aluminium Support

It is applied by pistol to a blasted or sanded aluminium support to form the sol-gel compositions of examples 1 to 14, according to the following cycle:
application to the support of a layer of sol-gel composition (A+B) with a humid thickness of 40 to 70 microns, drying for 3 minutes at 80° C., and
cooling to ambient temperature.

It is possible to apply this cycle a several times, the number of cycles being determined by the final preferred thickness.

On completion of the application/drying cycle(s), there is baking for 18 minutes at 280° C. This produces a coating having a dry thickness of between 30 and 70 microns, which is smooth, black and shiny.

The anti-stick coatings according to the invention R1 to R4 are the coatings obtained from sol-gel compositions according to the invention SG1 to SG4 respectively.

The anti-stick control coatings R01 and R02 are coatings obtained from sol-gel control compositions SG01 and SG02 respectively.

The properties of the different coatings obtained by application of each of the sol-gel compositions of examples 1 to 14 are listed in Table 7 hereinbelow.

TABLE 7

| Antiadhesive coating | Application cycles | Thickness (dry state) (μm) | Hardness (Moh) | Antiadherence (points) | Initial contact angle (°) | Contact angle after reconstitution (°) |
| --- | --- | --- | --- | --- | --- | --- |
| R01 (control) | 2 | 50 | 3-4 | 25 | 75 | 63 |
| R02 (control) | 2 | 50 | 3-4 | 25 | 73 | 62 |
| R1 | 2 | 50 | 3-4 | 100 | 93 | 77 |
| R2 | 2 | 50 | 3-4 | 100 | 96 | 79 |
| R3 | 1 | 30 | 3 | 100 | 93 | 75 |
| R4 | 2 | 70 | 4 | 100 | 94 | 76 |

The coatings R1 to R4 according to the invention exhibit hardness of between 3 and 4 Mohs, excellent antiadherence (100 points on the carbonised milk test: standard NF D 21-511), and good flame resistance (no change in appearance after 30 seconds in direct contact with the flame of the Bünsen burner). The contact angle of a drop of water on the coatings R1 to R4 is respectively at 93 and 96° (before flame contact).

A drop in hydrophobicity just after flame contact of the film (despite the unchanged appearance) is observed for the coatings R1 to R4: the contact angle becomes less than 30°. But on completion of the reconstitution process (at least 5 minutes at 200° C.), angles greater than 75° for the coatings R1 to R4 are observed.

Comparatively, the control coatings R01 and R02 exhibit, for equivalent hardness (between 3 and 4 Mohs), slight antiadherence (25 points on the carbonised milk test). Also, the static contact angle of a drop of water on these control coatings is of the order of 73-75° before flame contact. After flame contact, the angles of contact are slighter than those obtained with the coatings according to the invention (62-63° in place of 75-79°).

What is claimed is:

1. An anti-stick top coating characterised in that it is in the form of a continuous film having an average thickness between 30 and 70 μm and is constituted by a sol-gel material comprising:
30% to 50% by weight relative to the total weight of the coating of a matrix of at least one metallic polyalkoxylate forming a network;
at least 5% by weight relative to the total weight of the coating of at least one colloidal metallic oxide dispersed in said matrix; and
0.1% to 6% by weight of at least one silicone oil, by total weight of the coating for the reconstitution, at temperature between 200° C. and 600° C., of hydrophobic groups of polyalkoxylate at the surface of said continuous film, wherein the silicone oil is selected from phenyl silicones, methylphenyl silicones, and methyl silicones with a molecular weight of at least 1000 g, which is non-reactive and has a viscosity of between 20 and 2000 mPa·s.

2. The coating as claimed in claim 1, wherein the sol-gel material further comprises at least one filler and/or at least one pigment.

3. The coating as claimed in claim 2, wherein the pigment and/or the filler is in the form of flakes.

4. The coating as claimed in claim 2, wherein the pigment and/or the filler are of nanometric size.

5. The coating as claimed in claim 1, wherein the coating is free of PTFE.

6. The coating as claimed in claim 1, wherein the metallic polyalkoxylate is a polyalkoxysilane.

7. The coating as claimed in claim 6, wherein the polyalkoxysilane is amorphic.

8. The coating as claimed in claim 1, wherein metallic polyalkoxylate is an alum inate.

9. The coating as claimed in claim 1, wherein the sol-gel material comprises a mixed matrix of polyalkoxysilane and aluminate.

10. The coating as claimed in claim 1, wherein the matrix is grafted by at least one organic group selected from alkyl groups in $C_1$-$C_4$ and phenyl groups.

11. The coating as claimed in claim 10, wherein the organic group is a methyl group.

12. The coating as claimed in claim 1, wherein the colloidal metallic oxide is selected from the group consisting of silica, alumina, cerium oxide, zinc oxide, vanadium oxide and zirconium oxide.

13. The coating as claimed in claim 12, wherein the colloidal metallic oxide is colloidal silica.

14. The coating as claimed in claim 2, wherein the filler is selected from alumina, zirconium, mica, clays, and zirconium phosphate.

15. The coating as claimed in claim 2, wherein the pigment is selected from the group consisting of titanium dioxide, mixed oxides of copper-chrome-manganese, aluminosilicates, iron oxides, carbon black, pyralene red, metallic flakes and thermochromic pigments.

16. The coating as claimed in claim 1, wherein the silicone oil is a food-grade oil.

17. A culinary article having improved hydrophobic properties, comprising a support having an inner face capable of receiving foodstuffs and an outer face to be arranged towards a heat source, wherein the inner face is coated by an anti-stick top coating and the anti-stick top coating is a coating as defined by claim 16.

18. The culinary article as claimed in claim 17, wherein the support is a hollow cap having a base and a side wall rising from said base.

19. The culinary article as claimed in claim 17, wherein the support is made of a material selected from metals, wood, glass, ceramics, and plastics.

20. The culinary article as claimed in claim 19, wherein the support is a metallic support made of aluminium, anodised or not, or polished, brushed or beaded aluminium, or polished, brushed or beaded stainless steel, or cast, or hammered or polished copper.

21. The culinary article as claimed in claim 17, wherein the culinary article further comprises:
a base anti-stick coating arranged on the inner face of the support, said base anti-stick coating being constituted by a sol-gel material comprising a matrix of at least one metallic polyalkoxylate and at least 5% by weight relative to the total weight of the base anti-stick coating of at least one colloidal metallic oxide a decor arranged on the base anti-stick coating, the decor being constituted by a sol-gel material comprising a matrix of at least one metallic polyalkoxylate and at least 5% by weight relative to the total weight of the decor of at least one colloidal metallic oxide, a decor arranged on the base anti-stick coating, the decor being constituted by a sol-gel material comprising a matrix of at least one metallic polyalkoxylate and at least 5% by weight relative to the total weight of the decor of at least one colloidal metallic oxide.

22. The culinary article as claimed in claim 21, wherein the sol-gel material of the decor further comprises at least one silicon oil.

23. The culinary article as claimed in claim 21, wherein the decor further comprises at least one reversible thermochromic chemical substance.

24. The culinary article as claimed in claim 21, wherein the decor comprises at least two patterns, one of the patterns including a thermochromic chemical substance that darkens with temperature and the other pattern including a chemical substance that lightens with temperature.

25. The culinary article as claimed in claim 24, wherein the chemical substance that darkens with temperature is ferric oxide $Fe_2O_3$ and the chemical substance that lightens with temperature is perylene red associated with a black pigment.

26. The culinary article as claimed in claim 17, wherein the outer face of the support is coated with a base lacquer of one or more polyester silicon resins or a layer of enamel.

27. A process for coating the inner face of the support with the anti-stick top coating of claim 17, the process comprising:
a) preparing an aqueous composition A comprising:
  i) 5 to 30% by weight relative to the total weight of the aqueous composition A of at least one colloidal metallic oxide,
  ii) 0 to 20% by weight relative to the weight of the composition A of a solvent comprising at least one alcohol, and
  iii) 0.05 to 3% by weight relative to the total weight of said aqueous composition A of at least one silicon oil;
b) preparing a solution B comprising at least one precursor of metallic alkoxide type;
c) mixing solution A and solution B to produce a sol-gel composition (A+B) with 40 to 75% by weight of aqueous composition relative to the weight of the sol-gel composition (A+B), such that the quantity of colloidal metallic oxide represents 5 to 30% weight of the sol-gel composition (A+B) in the dry state;
d) applying to the support of at least one layer of the sol-gel composition (A+B) having a thickness between 30 and 70 μm in the humid state; and
e) cooking of said layer at a temperature of between 180° C. and 350° C. to obtain the anti-stick top coating having improved hydrophobic properties.

28. The process as claimed in claim 27, wherein the colloidal metallic oxide is selected from the group constituted by silica, alumina, cerium oxide, zinc oxide, vanadium oxide and zirconium oxide.

29. The process as claimed in claim 28, wherein the aqueous composition A comprises colloidal silica and/or colloidal alumina.

30. The process as claimed in claim 27, wherein the solvent of the composition A is an oxygen alcoholic solvent or an ether-alcohol.

31. The process as claimed in claim 27, wherein the precursor of metallic alkoxide type of the solution B is selected in the group constituted by:
  precursors corresponding to the general formula $M_1(OR_1)_n$,
  precursors corresponding to the general formula $M_2(OR_2)_{(n-1)}R_2'$, and
  precursors corresponding to the general formula $M_3(OR_3)_{(n-2)}R_3'_2$,
    wherein R1, R2, R2, or R3' designating an alkyl group; R2' designating an alkyl or phenyl group; n is a whole number corresponding to the maximum valence of the metals $M_1$, $M_2$, or $M_3$; and $M_1$, $M_2$, or $M_3$ designating a metal selected from Si, Zr, Ti, Sn, Al, Ce, Nb, Hf, Mg, or Ln.

32. The process as claimed in claim 31, wherein the metallic alkoxide is an alkoxysilane.

33. The process as claimed in claim 32, wherein the alkoxysilane is methyltrimethoxysilane (MTMS) or tetraethoxysilane (TEOS).

34. The process as claimed in claim 32, wherein the solution B further comprises aluminium alkoxide.

35. The process as claimed in claim 27, wherein the acid of the solution B is formic acid or acetic acid.

36. The process as claimed in claim 27, wherein at least one layer of sol-gel composition (A+B) is applied during step d) to a structure having the form of a hollow cap of a culinary article and defining said support.

37. The process as claimed in claim 27, wherein the support is made of a material selected from metals, wood, glass, ceramics and plastics.

38. The process as claimed in claim 27, wherein the process further comprises:
  f) depositing a layer of enamel on the face opposite that coated with the base anti-stick coating, the step of depositing the layer of enamel being completed prior to that of anti-stick coating.

* * * * *

UNITED STATES PATENT AND TRADEMARK OFFICE
CERTIFICATE OF CORRECTION

Page 1 of 1

PATENT NO. : 10,292,528 B2
APPLICATION NO. : 12/595868
DATED : May 21, 2019
INVENTOR(S) : Jean-Luc Perillon and Aurelien Dubanchet It is certified that error appears in the above-identified patent and that said Letters Patent is hereby corrected as shown below:

In the Claims

Claim 21, Column 16, please delete Lines 3-7 in its entirety.

Signed and Sealed this
Ninth Day of July, 2019

Andrei Iancu
*Director of the United States Patent and Trademark Office*